United States Patent [19]

Whitman et al.

[11] Patent Number: 4,852,266
[45] Date of Patent: Aug. 1, 1989

[54] ANGLE MEASURING ADAPTER

[75] Inventors: Robert W. Whitman; John R. Pellinen, both of Green Bay, Wis.

[73] Assignee: Essco, Incorporated, Green Bay, Wis.

[21] Appl. No.: 131,051

[22] Filed: Dec. 10, 1987

[51] Int. Cl.⁴ .............................................. G01C 9/06
[52] U.S. Cl. ........................................ 33/366; 33/534; 33/626
[58] Field of Search ................. 33/366, 390, 340, 341, 33/347, 371, 381, 384, 388, 644, 645, 600, 451, 534, 626

[56] References Cited

U.S. PATENT DOCUMENTS

| | | | |
|---|---|---|---|
| 948,523 | 2/1910 | Perkins | 33/388 X |
| 1,871,176 | 8/1932 | Hall | 33/341 X |
| 2,531,077 | 11/1950 | Mullin | 33/391 X |
| 2,777,210 | 1/1957 | Johnson et al. | |
| 2,816,369 | 12/1957 | Becker | 33/381 |
| 2,822,623 | 2/1958 | Leguis | 33/347 X |
| 2,972,816 | 2/1961 | Richardson | 33/388 V |
| 3,252,223 | 5/1966 | Gettel | |
| 3,324,564 | 6/1967 | Wright et al. | 33/366 |
| 4,123,848 | 11/1978 | Emmerich et al. | |
| 4,434,558 | 3/1984 | Face et al. | |
| 4,467,527 | 8/1984 | North et al. | |
| 4,470,198 | 9/1984 | Schering | |
| 4,480,390 | 11/1984 | Frissura et al. | |
| 4,506,448 | 3/1985 | Topping et al. | |
| 4,635,376 | 1/1987 | Fry | 33/384 |

FOREIGN PATENT DOCUMENTS 94115 1/1939 Sweden ................................. 33/381

Primary Examiner—Harry N. Haroian
Attorney, Agent, or Firm—Wheeler Law Firm

[57] ABSTRACT

An angle measuring device with a digital read-out mounted in a housing with two sharp parallel feet and a bisecting spring loaded needle, the housing having forty five degree, vertical and horizontal surfaces, useful for setting doctor blades and other surfaces to proper angles.

7 Claims, 1 Drawing Sheet

ANGLE MEASURING ADAPTER

The following invention relates to the subject of the Disclosure Document for an Essco Angle Measuring Adapter, Number 169033 filed at the U.S. Patent and Trademark Office on Mar. 23, 1987.

BACKGROUND OF THE INVENTION

Other types of leveling devices are known to the art but none of these devices disclose the unique features of the present inventions.

For example, Schering U.S. Pat. No. 4,470,198 is somewhat similar to the present inventions but the feet of the apparatus are blunt rather than sharp. Also, because the abutments are points in Schering, the Schering device would have limited applications for making measurements other than those shown in the Schering patent. Schering does show a level sensing device 8 that is off to the side and senses the position of the tool. Topping U.S. Pat. No. 4,506,448 shows a position sensing device with three probes including one spring mounted probe. The entire device is mounted at the end of the arm of a robot to determine the position of the arm with respect to some fixed part. It cannot be said that it contained an angle sensing unit. Frissora U.S. Pat. No. 4,480,390 shows a device having two side legs to be placed on a roll, but the remainder of the mechanism is quite different from the present invention even though it is intended to measure position. Emmerich U.S. Pat. No. 4,123,848 shows a device which has two legs that touch a roll, but the rest of the device consists of a number of plastic sheets which have scales on them which are lined up with the tool by eye and accordingly are quite different from the present invention. Gettel U.S. Pat. No. 3,252,223 is likewise a purely mechanical device in which various parts are held in position by sensors. Johnson U.S. Pat. No. 2,777,210 shows a system for measuring the position of a tool with respect to a rotating body on a lathe, but the principle of operation is completely different from the present invention. North U.S. Pat. No. 4,467,527 shows a digital level but is mounted in a rectangular body. The patent has more to do with the structure in a circular digital level than with the type of measurements carried out by the present invention. Face U.S. Pat. No. 4,434,558 shows a measuring device which has points at the two sides both of which are solidly mounted but one is adjustable. The center point is fixed. A gauge 22 measures the tilt and displays a digital reading. The concept in Face is very different and one skilled in the art would not expect to use this device for the principle purposes for the present invention. In general the tool of the present invention has uses for measuring characteristics that would be difficult or impossible to measure using the tools in the prior art.

SUMMARY OF THE INVENTION

This invention relates to angle measuring and leveling devices and more particularly to angle measuring and leveling devices having a digital read-out that are used to set doctor blades to both proper angle and level on machine rolls. The level of the present invention has a rotatable commercial electronic sensing unit which measures angles and an electronic read-out unit which displays the angle being measured. It also has a pair of sharp edged parallel linearly extending feet with a needle between them which bisects the angle formed by the feet, the needle being movable axially but in no other direction and being urged outwardly by a spring. The combination of a rotatable sensing unit, a pair of sharp parallel linear feet, and an axially movable needle between the sharp feet allow the level to make a number of measurements with respect to a roll and doctor blade which are very important and have been difficult to measure in the past. Additionally the shape of the housing of these sensing units also permits the making of other more conventional measurements.

A doctor blade is a flat blade which runs at a specific angle and/or a specific distance from a roller. It may be used to clean against a roll, or remove a web such as paper or plastic from the roll, or to level and control the thickness of a substance on a roll such as a paper coating: ink, plastic, or the like. In those uses it must have a specific angle with respect to the roll, the best angle varying with the application and the materials of the blade and the roll. The doctor blade must also be parallel to the axis of the roll in order to perform properly without undue wear on the blade or roll. Determination of, and adjusting the blade to, the correct level and parallel setting, is critical to the blade's performance. Thus a single easy to use easy to read highly accurate reliable instrument to measure both of these conditions is highly desirable to doctor blade installation and maintenance.

In use the feet of the present device are applied to a roll so that the needle that bisects the angle between the feet is precisely at the edge and at one end of the doctor blade. With the device in that position the electronic sensing unit is rotated until the display of the read out mechanism reads zero. This establishes a reference line between the two feet which is parallel to the line tangent to the roller which contains the edge of the doctor blade. When the feet of the housing unit are then placed on the end of the doctor blade itself, the electronic sensing unit will be at an angle to its original position which will be shown on the display of the read out mechanism. The angle shown will be the angle between the end of the doctor blade and the line which was the original setting but it is also the angle between the end of the doctor blade and the original line tangent to the roller. The reason for this is that a line which intersects two parallel lines will make the same angle with each of them. The present invention may also be used to measure the shim thickness required to level the doctor blade along the length of the machine roll. To make such a measurement the feet of the measuring unit are placed so that one foot touches the tip of the doctor blade and also touches the roll. The electronic sensing unit is then rotated to bring the measurement to zero (or any convenient figure). The level is then moved to the other end of the doctor blade (or any intermediate point). If the measurement is the same as it was for the first end, then the blade being measured is contained in a plane which is parallel to the axis of the roller as it should be. If it is not, a procedure described below allows measuring the required shim which will position the doctor blade in such a plane.

DRAWINGS

FIG. 5A shows the feet of the adapter resting on a horizontal surface.

FIG. 5B shows the side of the adapter resting against a vertical surface.

FIG. 5C shows another side of the adapter resting against a 45 degree angle surface.

DETAILED DESCRIPTION

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Figure 1:
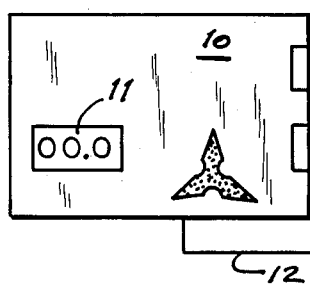
FIG. 1 shows a front view of a read-out device.
Figure 1A:
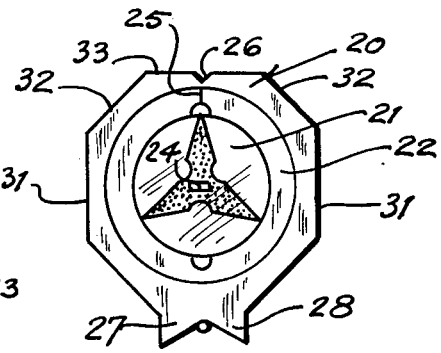
FIG. 1A shows a front view of the sensor.
Figure 1B:
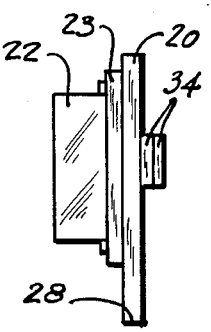
FIG. 1B shows a side view of the sensor.

In FIG. 1 there is shown a commercial read-out mechanism 10 which has a display 11 and a cord 12. The plug 13 at the end of the cord 12 plugs into a socket 24 on the sensing unit housing 22 shown in FIG. 1A. When the read-out mechanism 10 is connected to the known angle sensor 21 an electronic signal is transmitted from the sensor 21 to the read-out mechanism 10 and the angle is displayed on the display 11. FIG. 1A shows in some detail the angle level measuring device of the present invention. The device consists of a sensor 21 housed in a sensor unit housing 22 which is rotatably adjustably fixed to housing or adapter 20. The socket 24 on the sensor unit housing allows the sensor 21 contained in the housing 22 to be connected to the read-out mechanism 10 by means of the plug 13 shown in FIG. 1 which fits in the socket. 34 are preferably double locking nuts which allow the alignment disk 23 to rotate relative to the adapter 20 yet also may be locked to allow the alignment disk 23 to be fixed in a position relative to the adapter or housing 20 even when the adapter is rotated in space. The adapter 20 has a pair of sharp feet with linear parallel edges 27 and 28, and an alignment needle 29 which bisects the angle formed by the left foot 27 and the right foot 28, the needle 29 being movable axially but in no other direction and being urged outwardly by a spring in housing 20. The adapter also has two vertical sides 31, a substantially horizontal top side 33, and two angle sides 32, which are preferably at a 45 degree angle to both the top side 33 and the vertical side 31.

Figure 2:
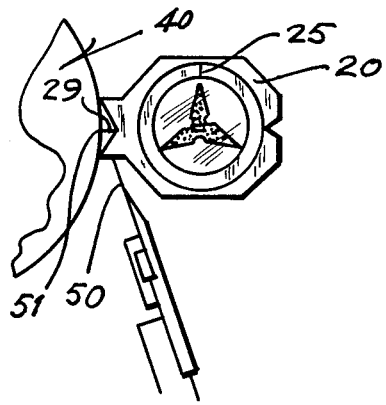
FIG. 2 shows the adapter placed on a roll so that the alignment needle contacts one end of the doctor blade.
Figure 2A:
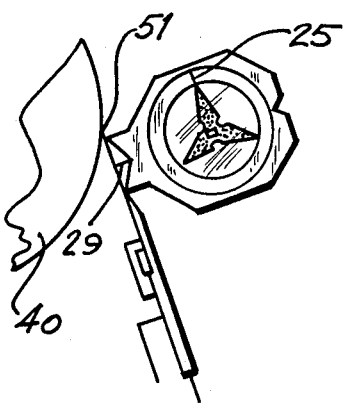
FIG. 2A shows the adapter placed on a doctor blade.

One method of using the device of the present invention is shown in FIGS. 2 and 2A. As shown in 2A the feet 27 and 28 of the present device are applied to a roll 40 so that the alignment needle 29 is precisely at the edge 51 of the doctor blade 50 at one end of the doctor blade. With the device in that position the sensor 21 and the sensor unit housing 22 are rotated along with the alignment disk 23 until the display 11 of the read-out mechanism 10 reads zero. This establishes a reference line between the two feet 27 and 28 which is parallel to the line tangent to the roll 40 which contains the edge 51 at the end of the doctor blade 50. When the feet 27 and 28 of the adapter 20 are then placed on the end of the doctor blade 50 itself the sensor will be at an angle to its original position which will then be shown on the display 11 of the read-out mechanism 10. The angle shown will be the angle between the end of the doctor blade 50 and the line which was the original setting. However this angle is also the angle between the end of the doctor blade 50 and the original line tangent to the roll 40. The reason for this is that a line which intersects two parallel lines will make the same angle with each of them.

Figure 3:
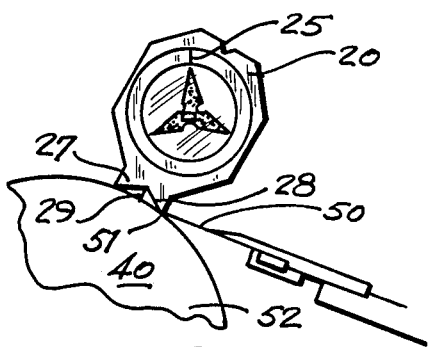
FIG. 3 shows the adapter placed on a roll so that one foot contacts the edge of the doctor blade at one end of the roll.
Figure 4:
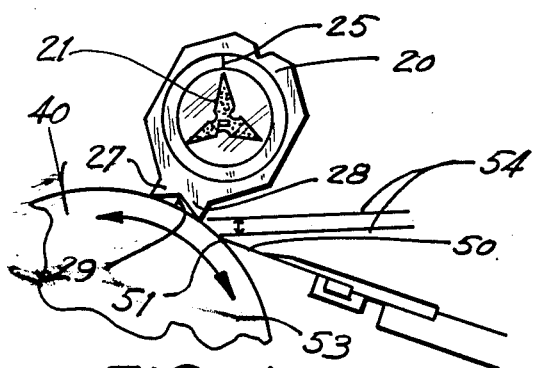
FIG. 4 shows the adapter when placed at the other end of the roll.
Figure 6:
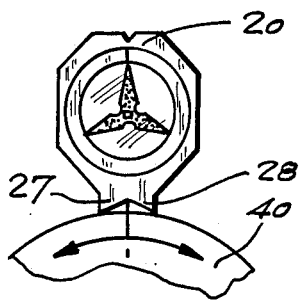
FIG. 6 shows the adapter placed on top of a roll.

The present invention may also be used to measure for the shim of the doctor blade 50 along the length of the roll 40 as shown in FIGS. 3 and 4. As shown in FIG. 3 to make such a measurement the feet 27 and 28 of the adapter are placed so that the right foot 28 touches the edge 51 of the doctor blade 50 at end 52 while both feet 27 and 28 also touch the roll 40. The sensor 21 is then rotated to bring the measurement displayed on the read-out display 11 to zero (or any convenient figure). The adapter 20 is then moved to the other end 53 of the doctor blade 50 (as shown in FIG. 4). If the measured angle is the same as it was for the first end 52 of the doctor blade, then the doctor blade 50 being measured is contained in a plane which is parallel to the axis of the roller 40 and needs no shim. As shown in FIG. 4 a shim is needed of a height shown by lines 54. As shown in FIG. 6 the present invention can also be used to determine the top dead center of the surface. This is done by aligning the index mark 25 on the disk with the index mark 26 on the adapter. Both adapter feet 27 and 28 are then placed in contact with the surface of the roll 40 and the adapter 20 can then be moved with respect to the circumference of the roll until a zero degree read-out is obtained. The alignment needle 29 on the adapter will indicate the top dead center. The device can also be used to establish the circumferential point plus or minus 45 degrees from the top dead center of the roll.

Figure 7:
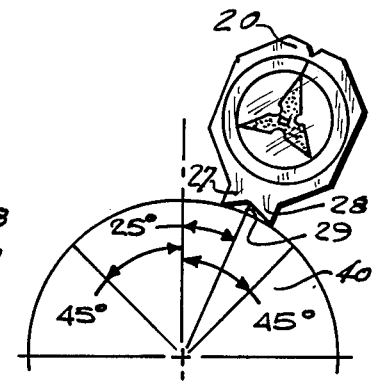
FIG. 7 shows the adapter placed on the roll to measure the angle from the vertical.
Figure 8:
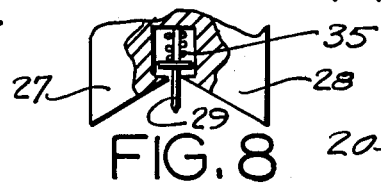
Figure 5:
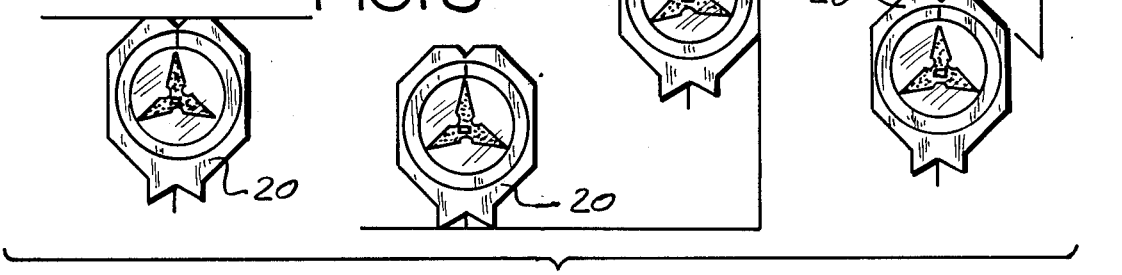
FIG. 5 shows the top of the adapter resting against a horizontal surface.

As shown in FIG. 7 at the top dead center the read-out device 10 will display zero degrees. To find an angular point from the top disk center, say 25 degrees, the adapter 20 is moved circumferentially until a read-out of 25 degrees is shown on the read-out device 10. The alignment needle 29 is then located at a point 25 degrees from the top dead center. By moving the adapter circumferentially to each 45 degree interval from the top dead center, starting at zero degrees reading at the top dead center, and then zeroing the read-out device 10 at that 45 degree interval, and so on, the horizontal can be established or any point around a 360 degree circumference. Other uses for the device are shown in FIGS. 5A, 5B and 5C. By aligning the index mark 26 on the adapter with the alignment disk index mark 25 the unit the read-out mechanism 10 will display zero degrees when both adapter feet 27 and 28 are in contact with a truly horizontal surface as shown in FIG. 5. Also, the preferred shape of adapter 20 permits the use of the housing top 33 to determine if an over hanging horizontal surface 60 is truly horizontal as shown in figure 5. Similarly the adapter sides are at a right angle to the plane of the feet 27 and 28. By placing either side 31 of the adapter against a truly vertical surface the read-out display 11 of the read-out mechanism 10 will display zero degrees. Finally when the angle side 32 of the adapter is placed against a 45 degree angle surface the read-out display 11 of the read-out mechanism will also read zero. In any of these measurements if the angle is other than correct the deviation will show on read-out 11.

We claim:

1. An angle gauge and level for directly measuring the angle of a doctor blade comprising a sensor, a read-out means, and a means connecting said sensor to said read-out means, said sensor being able to send an electronic signal to said read-out means, a housing, said sensor being rotatably fastened to said housing so that said sensor may be pre-set to a position respecting said housing, said position being able to be maintained even when said housing is rotated in space, said housing having two sharp parallel linear feet having connected sides forming an including angle, said read-out means being capable of displaying angle measures in which said housing having an alignment needle which bisects the angle between said feet, said alignment needle being movable axially but in no other direction, said alignment needle being urged outwardly by a spring.

2. The device of claim 1 further comprising an index mark on said housing and an index mark on said sensor which may be aligned with the index mark on said housing.

3. The device of claim 1 in which said feet of said housing are able to be placed on a roller on one end of a doctor blade which contacts said roller along the entire free edge of said doctor blade so that one foot of said feet contacts said free edge, said read out means being able to display a first angle measure when said foot contacts said free edge, said housing being capable of being moved to the opposite end of said doctor blade without rotating said sensor relative to said housing so that said foot may be placed in contact with said opposite end of said doctor blade when both of said feet contact said roller, said read out means displaying a second angle measure equal to said first angle measure when said foot contacts said opposite end of said doctor blade if said doctor blade is parallel to the access of said roller, said housing being capable of being moved along the circumference of said roller which contains said free edge of said opposite end of said doctor blade until said read out means displays an angle measure equal to said first angle measure if said second angle measure does not equal said first angle measure.

4. The device of claim 1 in which said housing has two sides which are parallel to each other and parallel to said alignment needle.

5. The device of claim 1 in which said housing has one side perpendicular to said alignment needle.

6. The device of claim 1 in which said housing has at least one side which is at a 45 degree angle to said alignment needle.

7. An angle gauge and level comprising a sensor, a read-out means, and a means connecting said sensor to said read-out means, said sensor being able to send an electronic signal to said read-out means, a housing, said sensor being rotatably fastened to said housing so that said sensor may be pre-set to a position respecting said housing, said position being able to be maintained even when said housing is rotated in space, said housing having two sharp parallel linear feet having connected sides forming an included angle, said read out means being capable of displaying angle measures, said housing having an alignment needle which bisects the angle between said feet, said alignment needle being movable axially but in no other direction, said alignment needle being urged outwardly by a spring said sensor and said housing each having an index mark which allows the position of said sensor relative to said housing to be visually determined at any moment.

* * * * *